(12) United States Patent
Teyssedre et al.

(10) Patent No.: US 7,179,763 B2
(45) Date of Patent: Feb. 20, 2007

(54) GREY GLASS COMPOSITION FOR PRODUCTION OF WINDOWS

(75) Inventors: Laurent Teyssedre, Paris (FR); Pierre Jeanvoine, Poissy (FR)

(73) Assignee: Saint-Gobain Glass France, Courbevoie (FR)

( * ) Notice: Subject to any disclaimer, the term of this patent is extended or adjusted under 35 U.S.C. 154(b) by 202 days.

(21) Appl. No.: 10/481,888

(22) PCT Filed: Jun. 26, 2002

(86) PCT No.: PCT/FR02/02210

§ 371 (c)(1),
(2), (4) Date: Jan. 2, 2004

(87) PCT Pub. No.: WO03/004427

PCT Pub. Date: Jan. 16, 2003

(65) Prior Publication Data

US 2004/0171473 A1 Sep. 2, 2004

(30) Foreign Application Priority Data

Jul. 2, 2001 (FR) .................................. 01 08773

(51) Int. Cl.
*C03C 3/087* (2006.01)

(52) U.S. Cl. ....................................................... 501/71

(58) Field of Classification Search .................. 501/71
See application file for complete search history.

(56) References Cited

U.S. PATENT DOCUMENTS

| | | | |
|---|---|---|---|
| 5,478,783 A | 12/1995 | Higby et al. | |
| 6,114,264 A * | 9/2000 | Krumwiede et al. | 501/70 |
| 6,624,102 B2 * | 9/2003 | Seto et al. | 501/71 |
| 2005/0245385 A1 * | 11/2005 | Landa et al. | 501/70 |

FOREIGN PATENT DOCUMENTS

| | | | |
|---|---|---|---|
| EP | 0 653 386 | | 5/1995 |
| EP | 0653386 | * | 5/1995 |
| EP | 0834481 | * | 10/1997 |
| RO | 113 843 | | 11/1998 |
| SU | 1 470 679 | | 4/1989 |

* cited by examiner

*Primary Examiner*—Karl Group
(74) *Attorney, Agent, or Firm*—Oblon, Spivak, McClelland, Maier & Neustadt, P.C.

(57) ABSTRACT

The subject of the invention is a gray glass composition of the soda-lime-silicate type having an overall light transmission under illuminant A ($T_{LA}$) greater than 67% for a glass thickness equal to 3.85 mm, which comprises the constituents below within the following limits by weight:

| | |
|---|---|
| $SiO_2$ | 64–75% |
| $Al_2O_3$ | 0–5% |
| $B_2O_3$ | 0–5% |
| CaO | 5–15% |
| MgO | 0–5% |
| $Na_2O$ | 10–18% |
| $K_2O$ | 0–5% | and the coloring agents below within the following limits by weight:

| | |
|---|---|
| $Fe_2O_3$ | 0.25–0.65% and preferably 0.5–0.65% |
| CoO | less than 20 ppm, preferably less than or equal to 15 ppm |
| NiO | 40–250 ppm and preferably 70–150 ppm |
| Se | 0–5 ppm | where $Fe_2O_3$ is the total iron.

25 Claims, No Drawings

GREY GLASS COMPOSITION FOR PRODUCTION OF WINDOWS

The invention relates to a glass composition of the soda-lime-silicate type intended for the production of flat glass of gray tint. Although the invention is not limited to such an application, it will be more particularly described with reference to automobile applications, especially for forming windshields and side windows located at the front of a vehicle.

Windows intended for the automobile industry are subject to requirements of various kinds. With regard to optical properties, these requirements are governed by regulations, for example in the case of the light transmission of a windshield, or else governed by concern for the comfort of the user, for example as regards energy transmission, or else for esthetic reasons, especially as regards color.

Apart from the requirements relating to light transmission and to energy transmission, the windows located at the front of vehicles must satisfy the esthetic desires of automobile manufacturers as regards color, in particular relative to the dominant wavelength and to purity.

Although coloring agents typical of giving such or such a color are generally known, it is difficult to find a particular color in terms of wavelength and purity, combined with specific characteristics, for example light transmission and energy transmission factors within a well-defined range of values.

Thus to obtain a gray glass, it is known to add coloring agents to the batch materials intended to be melted in order to produce the glass matrix. These coloring agents are, for example iron, selenium, nickel, cobalt, cerium, or erbium, etc.

Some of these agents, such as erbium, are expensive and for this reason are not employed or are added to the glass composition only in a very small amount.

Others are deemed to be highly polluting and require the fitting of substantial filtration systems, which generates a high cost burden. This is especially the case with selenium, which is commonly employed for producing gray glass, but 70 to 85% by weight of it is released into the atmosphere when it is melted. Consequently, the filtration systems specific to this element, with which melting plants are fitted so as to prevent pollution of the atmosphere, increase the production cost of such glass. Moreover, such glass is difficult to process because selenium has several oxidation states.

Yet other coloring agents allow the desired color to be obtained only if their content in the glass composition is relatively high. Introducing a large amount of colorant containing nickel into the glass composition results in the formation of nickel sulfide beads within the glass. Window panes produced from such glass have a tendency to fracture when they are subjected thereafter to a thermal toughening treatment because of the presence of these beads.

It is already known to produce gray-colored glass using a glass composition containing iron oxide, cobalt oxide and selenium. Such glass is, however, very dark and consequently does not meet the conditions required for front windows of a vehicle.

Compositions have been proposed in EP-A-0 653 386 for obtaining gray glass that can be used for automobiles. These compositions are characterized in that they contain either a mixture of iron oxide, cobalt oxide and selenium, or a mixture of iron oxide, cobalt oxide and nickel oxide, and possibly selenium. The compositions comprising nickel oxide contain cobalt oxide in an amount at least equal to 20 ppm. Such glass obtained from compositions of the latter category has a light transmission factor ($TL_A$) ranging from about 60% to about 72%, which meets the conditions required for use as a windshield and/or a front side window. However, windows having a $TL_A$ factor equal to or greater than 70% do not have a high energy transmission factor ($T_E$), this being at best equal to about 58%.

The object of the present invention is to propose a gray glass composition of the soda-lime-silicate type that has an overall light transmission under illuminant A ($T_{LA}$) compatible with use as a front window of an automobile, in particular a windshield, and a satisfactory overall energy transmission, and which can be sheeted on a bath of metal using the float glass technique.

The subject of the present invention is a glass composition that allows a window having a relatively neutral gray coloration to be obtained.

The subject of the present invention is also a glass composition that can be produced under the oxidation-reduction conditions usually observed for a standard float glass, and the cost of which is close to the cost of the latter.

These objects are achieved according to the invention thanks to a gray glass composition of the soda-lime-silicate type having an overall light transmission under illuminant A ($T_{LA}$) greater than 67% for a glass thickness equal to 3.85 mm, which comprises the constituents below within the following limits by weight:

| | |
|---|---|
| $SiO_2$ | 64–75% |
| $Al_2O_3$ | 0–5% |
| $B_2O_3$ | 0–5% |
| CaO | 5–15% |
| MgO | 0–5% |
| $Na_2O$ | 10–18% |
| $K_2O$ | 0–5% | and the coloring agents below within the following limits by weight:

| | |
|---|---|
| $Fe_2O_3$ | 0.25–0.65% and preferably 0.5–0.65% |
| CoO | less than 20 ppm, preferably less than or equal to 15 ppm and better still 5–15 ppm |
| NiO | 40–250 ppm and preferably 70–150 ppm |
| Se | 0–5 ppm | where $Fe_2O_3$ is the total iron.

According to a preferred embodiment of the invention, the overall energy transmission ($T_E$) is less than or equal to 55%, preferably less than 50%, for a thickness of 3.85 mm. Such requirements correspond in particular to those required in the automobile field in order to provide for the thermal comfort of passengers in the passenger compartment. Also preferably, the glass composition has a dominant wavelength under illuminant $D_{65}$ of between 480 and 550 nm, preferably between 490 and 510 nm, and an excitation purity under the same illuminant of less than 6%, preferably less than 5%, for a thickness of 3.85 mm. Such requirements correspond in particular to those required for the desired neutral coloration in the case of front side windows of automobiles. The glass obtained may have a tint ranging from gray-blue to gray-green depending on the dominant wavelength.

Also preferably, the glass composition has a redox value of less than 0.55 and preferably less than 0.35, and better still greater than 0.18. The redox value is defined by the ratio of the FeO content to the total iron content, expressed in $Fe_2O_3$ form, the contents being expressed as percentages by weight.

According to an advantageous embodiment of the invention, the composition contains no intentionally added selenium, except for the impurities that may be introduced by certain raw materials.

According to another particularly advantageous embodiment of the invention, and especially for applications of the windshield and side window type for automobiles, the overall light transmission under illuminant A ($T_{LA}$) is greater than or equal to 69%, preferably greater than or equal to 70%, and the energy transmission is less than 50%, preferably less than 48%, for a thickness of 3.85 mm.

In the glass according to the invention, the silica is generally maintained within very narrow limits for the following reasons: above about 75%, the viscosity of the glass and its ability to devitrify greatly increase, which makes it more difficult for the glass to melt and to flow on a bath of molten tin, while below 64% the hydrolytic resistance of the glass rapidly decreases.

This reduction in the hydrolytic resistance of the glass may be compensated for, at least in part, by the introduction of $Al_2O_3$, but this oxide contributes to increasing its viscosity and reducing the transmission in the visible. Consequently, it is envisioned to use it only in a very small amount.

The alkali metal oxides $Na_2O$ and $K_2O$ facilitate melting of the glass. $K_2O$ may be used up to about 5%, since above this the problem of the high cost of the composition arises. The sum of the $Na_2O$ and $K_2O$ contents, expressed as percentages by weight, is preferably equal to or greater than 13%.

Alkaline-earth metal oxides play a key role in obtaining the properties of the glass according to the invention.

As regards the oxide MgO, according to a first embodiment of the invention, its content is advantageously greater than 2%, especially for economic reasons.

According to another embodiment, its content is less than 2%. This is because it has been demonstrated that limiting the MgO content to 2% has the effect of shifting the maximum in the FeO absorption band toward longer wavelengths, thus making it possible to increase the infrared absorbtivity without impairing the transmission in the visible. Complete elimination of MgO, which plays an important role in the viscosity, may be compensated for, at least in part, by increasing the content of $Na_2O$ and/or $SiO_2$.

BaO makes it possible to increase the light transmission, and it may be added to the composition according to the invention with a content of less than 4%. This is because BaO has a much smaller effect than MgO and CaO on the viscosity of the glass. Within the context of the invention, the increase in BaO takes place essentially to the detriment of the alkali metal oxides, MgO and especially CaO. Any significant increase in BaO therefore contributes to increasing the viscosity of the glass, especially at low temperatures. In addition, introducing a high percentage of BaO substantially increases the cost of the composition. Preferably, the glass according to the invention contains no BaO. When it does contain BaO, its content is preferably between 0.5 and 3.5% by weight.

Apart from complying with the limits defined above for the variation in the content of each alkaline-earth metal oxide, it is preferable in order to obtain the desired transmission properties to limit the sum of the percentages of MgO, CaO and BaO by weight to a value equal to or less than 14%.

When it is desired to produce selective glasses (that is to say glasses capable of absorbing radiation within a desired wavelength range, for example corresponding to ultraviolet or infrared radiation, without appreciably affecting the light transmission), the glass compositions may furthermore include at least one optical absorption agent, such as $CeO_2$, $TiO_2$, $Cr_2O_3$, $V_2O_5$, $WO_3$, $La_2O3$, etc. The total content of this (these) agent(s) is generally maintained at less than 2% by weight of the composition, and preferably less than 1%.

The glass according to the invention may also contain up to 1% of other constituents provided by the impurities in the glass raw materials and/or by introducing recycled cullet into the glass batch and/or by using a refining agent ($SO_3$, Cl, $Sb_2O_3$, $As_2O_3$).

To facilitate melting, and especially to make this mechanically useful, the matrix advantageously has a temperature, corresponding to a viscosity $\eta$ such that $\log \eta=2$, which is less than 1500° C. More preferably, especially when it is desired to obtain the glass in the form of a glass ribbon using the float glass technique, the matrix has a temperature corresponding to the viscosity $\eta$, expressed in poise, such that $\log \eta=3.5$ (denoted by $T_{\log \eta=3.5}$) and a liquidus temperature (denoted by $T_{liq}$) which satisfy the equation:

$$T_{\log \eta=3.5} - T_{liq} > 20° C.,$$

and preferably the equation:

$$T_{\log \eta=3.5} - T_{liq} > 50° C.$$

A better appreciation of the advantages of the present invention will be gained from the examples of glass compositions given below.

In these examples, the values of the following properties, measured for a thickness of 3.85 mm, are indicated:

the overall light transmission factor under illuminant A ($T_{LA}$) between 380 and 780 nm;

the overall energy transmission factor ($T_E$) integrated between 295 and 2500 nm according to the ISO 9050 standard (Parry Moon, air mass 2);

the ultraviolet solar radiation transmission factor ($T_{UV}$) calculated according to the ISO 9050 standard;

the dominant wavelength ($\lambda_d$) under illuminant $D_{65}$; and the excitation purity ($P_{D65}$) under illuminant $D_{65}$.

The light transmission ($T_{LA}$), the dominant wavelength ($\lambda_d$) and the purity (P) were calculated using the 1931 CIE (Commission Internationale de l'Eclairage) calorimetric reference observer.

Each of the compositions given in the table was produced from the following glass matrix, the contents of which are expressed as percentages by weight, each being corrected in terms of silica in order to be adjusted to the total content of coloring agents added:

| | |
|---|---|
| $SiO_2$ | 71.00% |
| $Al_2O_3$ | 0.70% |
| CaO | 8.90% |
| MgO | 3.80% |
| $Na_2O$ | 14.10% |
| $K_2O$ | 0.10%. |

The temperatures $T_{\log \eta=2}$ and $T_{\log \eta=3.5}$, corresponding to the viscosities, expressed in poise, such that $\log \eta=2$ and $\log \eta=3.5$ respectively, together with the liquidus temperature $T_{liq}$ are identical for all the glass compositions given (these being produced from the same glass matrix) and are the following:

| | |
|---|---|
| $T_{log\eta=2}$ | 1410° C. |
| $T_{log\eta=3.5}$ | 1100° C. |
| $T_{liq}$ | 1060° C. |

The glasses of examples 1 to 5 are examples produced according to the invention, the compositions of which were measured, whereas the glasses of examples 6 to 18 are given with their theoretical compositions.

in which case they are formed from several glass sheets, at least one of which is obtained from the composition according to the invention.

The windows falling within the scope of the present invention may be subjected beforehand to surface treatments or may receive, for example, an organic coating, such as a polyurethane-based film with antilacerating properties, or a film that provides sealing should a window shatter.

These windows may also be coated with at least one metal oxide layer obtained by high-temperature chemical deposition using pyrolysis or chemical vapor deposition (CVD) or vacuum deposition techniques.

TABLE

| | 1 | 2 | 3 | 4 | 5 | 6 | 7 | 8 | 9 |
|---|---|---|---|---|---|---|---|---|---|
| $Fe_2O_3$ (%) | 0.56 | 0.57 | 0.54 | 0.54 | 0.58 | 0.51 | 0.26 | 0.50 | 0.60 |
| FeO(%) | 0.15 | 0.185 | 0.21 | 0.165 | 0.178 | 0.18 | 0.13 | 0.12 | 0.21 |
| Redox value | 0.27 | 0.32 | 0.39 | 0.30 | 0.31 | 0.35 | 0.50 | 0.24 | 0.35 |
| CoO (ppm) | 9 | 6 | 10 | 9 | 10 | 0 | 14 | 13 | 3 |
| NiO (ppm) | 150 | 100 | 80 | 80 | 80 | 150 | 150 | 200 | 45 |
| Se (ppm) | 0 | 0 | 0 | 0 | 0 | 0 | 0 | 0 | 0 |
| $T_{LA}$(%) | 69.3 | 70.3 | 69.0 | 71.7 | 70.4 | 71.7 | 71.7 | 69.2 | 73.2 |
| $T_E$(%) | 48.9 | 46.3 | 44.7 | 49.4 | 47.1 | 48.3 | 54.9 | 53.8 | 46.9 |
| $T_{UV}$(%) | 32.0 | 32.1 | 32.1 | 33.7 | 31.2 | 34.1 | 51.5 | 31.0 | 31.1 |
| $\lambda_d$(nm) | 507 | 495 | 493 | 495 | 495 | 507 | 495 | 546 | 492 |
| $P_{D65}$(%) | 2.2 | 4.2 | 5.4 | 3.64 | 4.1 | 2.3 | 2.7 | 3.0 | 5.7 |
| | 10 | 11 | 12 | 13 | 14 | 15 | 16 | 17 | 18 |
| $Fe_2O_3$ (%) | 0.45 | 0.49 | 0.34 | 0.62 | 0.45 | 0.51 | 0.45 | 0.5 | 0.45 |
| FeO(%) | 0.16 | 0.148 | 0.124 | 0.13 | 0.16 | 0.13 | 0.16 | 0.13 | 0.16 |
| Redox value | 0.36 | 0.30 | 0.36 | 0.21 | 0.36 | 0.25 | 0.35 | 0.26 | 0.35 |
| CoO (ppm) | 15 | 14 | 15 | 15 | 10 | 10 | 0 | 19 | 18 |
| NiO (ppm) | 50 | 110 | 130 | 80 | 50 | 75 | 143 | 200 | 100 |
| Se (ppm) | 0 | 0 | 0 | 0 | 5 | 0 | 0 | 0 | 0 |
| $T_{LA}$(%) | 73.1 | 71.3 | 72.1 | 72.4 | 69.0 | 74.5 | 73.3 | 67 | 67.6 |
| $T_E$(%) | 51.9 | 51.9 | 55.0 | 54.3 | 49.2 | 55.0 | 51.4 | 51.7 | 49.0 |
| $T_{UV}$(%) | 36.4 | 33.2 | 41.7 | 26.4 | 30.1 | 31.1 | 36.2 | 35.0 | 36.8 |
| $\lambda_d$(nm) | 489 | 495 | 496 | 499 | 517 | 497 | 512 | 517 | 494 |
| $P_{D65}$(%) | 5.8 | 3.2 | 2.7 | 2.6 | 1.2 | 2.7 | 1.8 | 1.6 | 3.0 |

Examples 1 to 18 according to the invention show that, within a wide range of coloring agents, it is possible to obtain neutral gray glass that meets the optical constraints, namely a high overall light transmission ($T_{LA}$>67%) and a relatively low energy transmission, at most equal to 55%. These good glass properties result to a large extent from the fact that the cobalt oxide content in the composition is less than 20 ppm. The examples also show that the target optical properties can be achieved without adding selenium, this being particularly advantageous as regards costs and the risk of polluting the environment.

Any glass obtained from the compositions according to the invention is compatible with the usual techniques for manufacturing flat glass. The thickness of the glass ribbon obtained by sheeting out the molten glass on a bath of tin may be up to 20 mm, and in general this will vary between 0.8 and 10 mm.

Window glass (obtained by cutting the glass ribbon) may subsequently undergo a bending and/or enameling operation, especially when it is used for automobile windows.

To produce windshields or side windows, the window glass is initially cut from a glass ribbon whose thickness generally varies between 3 and 5 millimeters. With these thicknesses, the glass ensures good thermal comfort. The windshields or side windows in question may be laminated,

The invention claimed is:

1. A gray glass composition of the soda-lime-silicate type having an overall light transmission under illuminant A ($T_{LA}$) greater than 67 for a glass thickness equal to 3.85 mm, comprising the constituents below within the following limits by weight:

| | |
|---|---|
| $SiO_2$ | 64–75% |
| $Al_2O_3$ | 0–5% |
| $B_2O_3$ | 0–5% |
| CaO | 5–15% |
| MgO | 0–5% |
| $Na_2O$ | 10–18% |
| $K_2O$ | 0–5% | and the coloring agents below within the following limits by weight:

| | |
|---|---|
| $Fe_2O_3$ | 0.25–0.65% |
| CoO | less than or equal to 10 ppm |
| NiO | 40–250 ppm |
| Se | 0–5 ppm | where $Fe_2O_3$ is the total iron.

2. The glass composition as claimed in claim 1, wherein the CoO content is from 5 to 10 ppm.

3. The glass composition as claimed in claim 1, having an overall energy transmission (TE) of less than 55%, for a thickness of 3.85 mm.

4. The glass composition as claimed in claim 1, having a redox value of less than 0.55.

5. The glass composition as claimed in claim 1, wherein the overall light transmission (TLA) is greater than or equal to 690.

6. The glass composition as claimed in claim 5, wherein the overall energy transmission (TE) is less than 48%.

7. The glass composition as claimed in claim 1, wherein no selenium is present.

8. The glass composition as claimed in claim 1, having a dominant wavelength of between 480 and 550 nm and a purity of less than 6% under illuminant $D_{65}$ and for a thickness of 3.85 mm.

9. The glass composition as claimed in claim 8, wherein the dominant wavelength is between 490 and 510 nm.

10. The glass composition as claimed in claim 8, having a purity of less than 5%.

11. The glass composition as claimed in claim 1, further comprising at least one optical absorption agent selected from the group consisting of $CeO_2$, $TiO_2$, $Cr_2O_3$, $V_2O_5$, $WO_3$, and $La_2O_3$.

12. The glass composition as claimed in claim 1, wherein the difference between the temperature corresponding to a viscosity η expressed in poise wherein log η=3.5, and the liquidus temperature $T_{liq}$ is greater than 20° C.

13. The glass composition as claimed in claim 1, wherein the temperature corresponding to a viscosity η expressed in poise wherein log η=2, is less than 1500° C.

14. A window comprising at least one glass pane whose chemical composition is defined by claim 1.

15. The window as claimed in claim 14, wherein the pane has a dominant wavelength of between 480 and 550 nm and a purity of less than 6% under illuminant $D_{65}$ for a thickness of 3.85 mm.

16. The window as claimed in claim 15, wherein the pane has a dominant wavelength of between 490 and 510 nm and a purity of less than 5%.

17. The window as claimed in claim 14, wherein the pane has a thickness of up to 20 mm.

18. A laminated glass window comprising two glass panes, at least one of which is formed from the glass composition as claimed in claim 5.

19. The glass composition of claim 1, wherein $Fe_2O_3$ is present in an amount of from 0.5 to 0.65% by weight.

20. The glass composition of claim 1, wherein NiO is present in an amount of from 70 to 150 ppm.

21. The glass composition of claim 3, wherein the overall energy transmission is less than 50%.

22. The glass composition of claim 4, wherein the redox value is <0.3.

23. The glass composition of claim 4, wherein the redox value is from 0.18 to 0.55.

24. The glass composition of claim 12, wherein the temperature difference is >50° C.

25. The window of claim 17, wherein the pane has a thickness of from 0.8 to 10 mm.

* * * * *